United States Patent [19]

Bjornsen

[11] 3,722,924
[45] Mar. 27, 1973

[54] COMBINED COUPLING AND SEALING ADAPTER

[76] Inventor: Melvin G. Bjornsen, 805 West San Marino, Alhambra, Calif. 91801

[22] Filed: Oct. 16, 1970

[21] Appl. No.: 81,239

[52] U.S. Cl..................285/55, 285/370, 285/237
[51] Int. Cl.................................F16l 55/00
[58] Field of Search......285/55, 53, 49, 47, 174, 237, 285/239, 370, 423, 15

[56] References Cited

UNITED STATES PATENTS

| 3,236,543 | 2/1966 | Mueller | 285/423 X |
| 3,378,282 | 4/1968 | Demler | 285/174 |
| 1,115,992 | 11/1914 | Weber | 285/55 X |
| 1,584,394 | 5/1926 | Munley | 285/238 |
| 2,907,591 | 10/1959 | Gulick | 285/370 X |
| 568,996 | 10/1896 | Totham | 285/174 |

Primary Examiner—David J. Williamowsky
Assistant Examiner—Wayne L. Shedd
Attorney—Boniard I. Brown

[57] ABSTRACT

A combined coupling and sealing adapter for joining threaded male and female base coupling members, particularly damaged coupling members. The adapter has a compliant tubular body with threaded male and female ends for threaded connection to the female and male base coupling members, respectively, and a terminally flanged resilient sealing sleeve captivated within the adapter body for sealing contact with the coupling members.

1 Claim, 5 Drawing Figures

Patented March 27, 1973                      3,722,924

INVENTOR.
Melvin D. Bjorncon.

COMBINED COUPLING AND SEALING ADAPTER

BACKGROUND OF THE INVENTION

1. Field of the Invention

This invention relates generally to base couplings and more particularly to a combined coupling and sealing adapter for joining threaded male and female base coupling members, especially damaged coupling members.

2. Discussion of the Prior Art

As will appear from the ensuing description, the invention may be applied to virtually any type of threaded base couplings. However, the invention is concerned primarily with and will be described in relation to garden hose couplings.

Most of the couplings used on garden hoses are of the threaded type and are standardized as to the threads, sealing surfaces, depth and size of bore and other pertinent details essential to interchangeable couplings of such hoses to one another and to fittings, such as water taps, nozzles, lawn sprinklers, and the like. These couplings function quite well while in a new condition, but unfortunately this new condition does not last very long. The garden hose is not an easy article to handle, especially the plastic hose. Quite often the hose coupling ends are dropped on cement, or stepped on, or run over with wagons, bicycles or cars, or dragged from one spot to another. Also, the male and female coupling threads are often cross threaded.

When any of the above situations occur, the hose couplings are generally damaged by being bent, nicked, burred and/or distorted. Moreover, as a hose is moved, dragged, dropped or thrown, the washer type seal comes out of the female coupling end and is lost. This causes the inconvenience of finding and replacing the seal.

Once such hose couplings are damaged they are generally unusable owing to water leakage when assembled or inability to assemble the coupling. Even if it is possible to start the damaged threads it will probably require hand tools to complete assembly and later to disassemble the coupling.

Most of the garden hose couplings in present use are made of metal which has a tendency to gall and seize. This occurs much of the time, especially with damaged mating coupling parts, when tools are used to force mating parts together. Even after all this trouble to assemble the couplings, they generally leak.

SUMMARY OF THE INVENTION

One of the primary objects of my invention is to provide a combined coupling and sealing adapter for joining standard garden hose couplings and hose attachments wherein the seal is self-contained and held firmly in place even though the coupling to which it is a part is disconnected.

Another object of my invention is to provide a combined coupling and sealing adapter for standard garden hose couplings and hose attachments which is compliant to form and seal itself to a damaged or distorted male or female garden hose coupling.

A further object of my invention is to provide a combined coupling and sealing adapter for a standard garden hose coupling and hose attachments which protects the hose ends, especially the male threaded end.

Another object of my invention is to provide a combined coupling and sealing adapter for use with a standard garden hose and its attachments which can be used with the old washer type seal.

Another object of my invention is to provide a combined coupling and sealing adapter for standard garden hose couplings and hose attachments which eliminates the metal to metal contact now common to the metal hose couplings now in common use.

Further features and details will appear from a detailed description of the drawing in which.

DESCRIPTION OF THE PREFERRED EMBODIMENT

Figure 1:
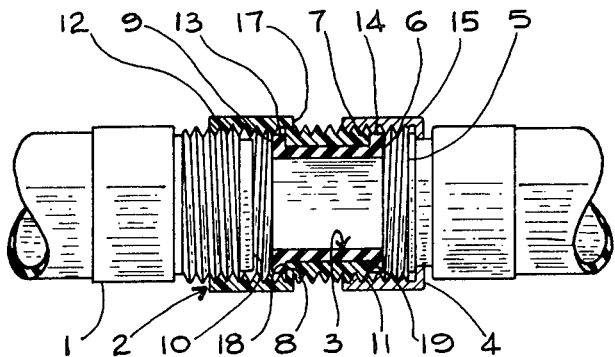
FIG. 1 is a cross-section through a present coupling adapter shown partially assembled to the male coupling end and the female coupling end of a standard garden hose coupling.

Referring to FIG. 1, the present combined coupling and sealing adapter 2 has a compliant tubular body 10 with male threads 11 and female threads 12 made to the specifications of the standard garden hose coupling threads. The male and female ends of the body define therebetween an external shoulder 17 and an internal shoulder 18. These shoulders together form a web which separates the female and male threads and serves to join the body ends. This web has a thickness of approximately 0.05 inch and has a direct bearing on the compliancy or flexibility of the adapter body.

Figure 4:
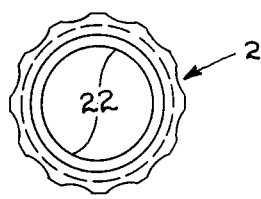
FIG. 4 is an end view of the adapter body.
Figure 5:
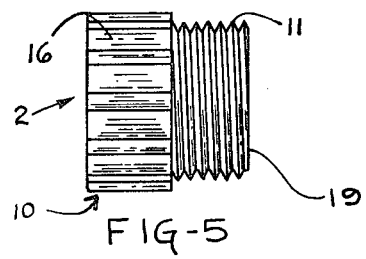
FIG. 5 is an elevation view of the adapter body.
Figure 2:
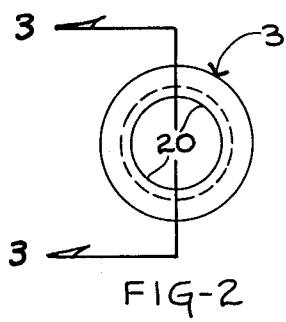
FIG. 2 is an end view of a sealing element embodied in the adapter.
Figure 3:
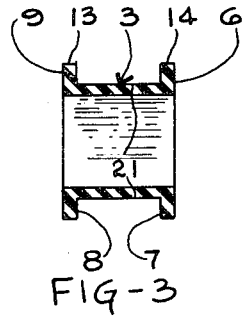
FIG. 3 is a cross-section on the line 3—3 of FIG. 2.

FIG. 5 shows serrations 16 on the adapter body 10 for gripping the body to tighten the female threads 12 on the male end 1 of a standard hose coupling.

A tubular sealing element or sleeve 3 is contained in the adapter body 10 by flanges 13 and 14 which seat against the internal body shoulder 18 and the end face of the male body end, respectively. The sealing sleeve contains a water passage 20. Between its flanges 13, 14, the sealing sleeve has a cylindrical wall 21 which engages the wall of the male end of the adapter body.

The adapter body 10 is made of a compliant plastic, such as polyethylene of medium density and can be manufactured in several ways, probably the least expensive and most desirable being injection molding, as the wall thickness throughout the adapter configuration is quite uniform.

The sealing sleeve 3 is made of rubber or Neoprene of approximately 50 shore hardness. Either of these two materials can be molded very efficiently at a reasonable cost, by standard rubber molding process. A 0.10 inch thickness of the sealing sleeve flanges 13 and 14 has proven to be of ample depth not to cut through and have enough resiliency to make an excellent seal as it shapes and bends to the mating components.

The use of this invention is very simple. As an example refer to FIG. 1 which shows the adapter 2 partially assembled to the male and female end couplings 1, 4 of a garden hose.

The couplings and adapter are assembled by gripping the hose with one hand and with the other hand gripping the adapter 2 at serrated diameter 16 and threading female threads 12 onto male threads of hose coupling 1 until hand tight. This action forces the end face 10 of male coupling part 1 against sealing sleeve flange 13 and the flange against adapter body shoulder 18. This seals the female end of the adapter 2 to the male hose coupling 1.

Next, the male hose coupling 1 or the serrated diameter 16 of adapter 2 is gripped with one hand and the free turning ring 15 of female coupling 4 is gripped and rotated with the other hand until tight. This action forces end face 5 of hose coupling 4 against sealing sleeve flange surface 6 which forces flange surface 7 against end face 19 of adapter 2. This completes the assembly and provides a seal at two places instead of one as would be the case with the old type coupling and seal. It can readily be seen this is a big advantage as it allows the adapter 2 to remain assembled to either the male or female coupling 1 or 4. Since the adapter body 10 is compliant, it may be threaded on the hose couplings 1, 4 even though the couplings are damaged.

To use the adapted 2 without the self-contained seal 3 merely install a standard washer type seal in the female hose coupling 4 and in the female end of adapter 2.

To assemble seal 3 into adapter 2 fold either flange of seal and push this folded flange end into bore 22, as the folded flange reaches the thread counterbore it will snap into place. This seal 3 is a slip fit in the adapter 2 and the seal 3 being of resilient material, assembly and disassembly of this seal is quite easy.

What is claimed as new in support of Letters Patent is:

1. A combined coupling and sealing adapter for joining male and female hose couplings comprising:

a compliant tubular body having an externally threaded male end and an internally threaded opposite female end both with right hand threads for threaded connection to said female and male couplings, and a resilient sealing sleeve within said body which is substantially symmetrical about a plane bisecting the sleeve endwise and includes an external sealing flange at one end engaging the end face of said male body end, an external sealing flange at its other end engaging an internal shoulder within said female body end, and a tubular portion between said sleeve flanges fitting closely within a cylindrical opening in said body.

* * * * *